(12) United States Patent  
Ishii

(10) Patent No.: US 7,556,195 B2  
(45) Date of Patent: Jul. 7, 2009

(54) CARD READER AND WRITER

(75) Inventor: Masayuki Ishii, Yasu (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 625 days.

(21) Appl. No.: 11/240,484

(22) Filed: Oct. 3, 2005

(65) Prior Publication Data

US 2006/0211288 A1    Sep. 21, 2006

(30) Foreign Application Priority Data

Mar. 17, 2005    (JP) .............................. 2005-076940

(51) Int. Cl.
- G06K 7/08    (2006.01)
- G06K 19/00   (2006.01)
- G06K 7/00    (2006.01)
- H01R 13/62   (2006.01)

(52) U.S. Cl. ...................... 235/451; 235/435; 235/449; 235/487; 439/159; 439/160

(58) Field of Classification Search ................. 235/435, 235/449.451, 487, 375, 380, 382; 439/159, 439/160
See application file for complete search history.

(56) References Cited

U.S. PATENT DOCUMENTS

| | | | | |
|---|---|---|---|---|
| 3,946,206 A | * | 3/1976 | Darjany ........................ 360/2 |
| 4,296,315 A | * | 10/1981 | Weimer et al. .............. 235/460 |
| 4,581,523 A | * | 4/1986 | Okuno ....................... 235/479 |
| 4,871,905 A | * | 10/1989 | Mita et al. ................... 235/475 |
| 5,089,694 A | * | 2/1992 | Zerfahs et al. .............. 235/486 |
| 5,107,099 A | * | 4/1992 | Smith ........................ 235/449 |
| 5,508,501 A | * | 4/1996 | Fujimoto et al. ............ 235/441 |
| 5,517,013 A | * | 5/1996 | Bradbury ................... 235/485 |
| 6,097,692 A | * | 8/2000 | Suzuki ....................... 369/262 |
| 7,014,118 B1 | * | 3/2006 | Ramey et al. .............. 235/486 |
| 2001/0017318 A1 | * | 8/2001 | Nagata et al. .............. 235/451 |
| 2001/0027996 A1 | * | 10/2001 | Smith et al. ................ 235/440 |
| 2001/0045467 A1 | * | 11/2001 | Manthe ..................... 235/486 |
| 2002/0050516 A1 | * | 5/2002 | Kitchen ..................... 235/441 |
| 2002/0117550 A1 | * | 8/2002 | Hirasawa ................... 235/479 |
| 2003/0201330 A1 | * | 10/2003 | Nagata et al. .............. 235/475 |

(Continued)

FOREIGN PATENT DOCUMENTS

JP    2586324    12/1996

(Continued)

*Primary Examiner*—Daniel Walsh
(74) *Attorney, Agent, or Firm*—Antonelli, Terry, Stout & Kraus, LLP.

(57) ABSTRACT

A card reader and writer is provided which can perform read and write operation on a card in a stable manner although it is configured such that a card inserting direction is perpendicular to a head moving direction and the card is partially inserted into the device. When a card is inserted into a case and comes into abutment against a depth abutment member of a slider, the slider moves in the depth direction. With this movement, pivotal levers pivot and holders come into abutment against end faces of the card in the width direction to grip the card in the width direction. At the same time, in accordance with the movement of the slider, an engaging shaft of the slider causes a pivotal engaging member to pivot and comes into engagement with an engaging recess after a predetermined amount of pivotal movement.

9 Claims, 4 Drawing Sheets

U.S. PATENT DOCUMENTS

| | | | |
|---|---|---|---|
| 2004/0262389 A1* | 12/2004 | Nagata et al. | 235/441 |
| 2006/0211288 A1* | 9/2006 | Ishii | 439/159 |
| 2006/0283955 A1* | 12/2006 | Riester et al. | 235/475 |
| 2007/0084922 A1* | 4/2007 | Klostermeier et al. | 235/441 |

FOREIGN PATENT DOCUMENTS

| | | |
|---|---|---|
| JP | 2793434 | 6/1998 |

* cited by examiner

CARD READER AND WRITER

CLAIM OF PRIORITY

The present application claims priority from Japanese application JP2005-76940 filed on Mar. 17, 2005, the content of which is hereby incorporated by reference into this application.

BACKGROUND OF THE INVENTION

The present invention relates to a card reader and writer for reading and writing information from and to a magnetic information recording card. In particular, the present invention relates to a card reader and writer for reading and writing information by moving a head in a card width direction perpendicular to a card insertion direction.

The conventional card reader and writers has two types: an automatic type wherein a card is inserted and ejected automatically; a manual type wherein a card is not automatically inserted and ejected. In many conventional card reader and writers, the card insertion/ejection direction and the head moving direction are the same.

An automatic type card reader and writer performs read processing and write processing after a card is inserted into the interior of the device and therefore it is possible to prevent the malfunction caused by operation performed by a user. However, since the card is inserted completely into the interior of the device, a deformed card is apt to jam within the device (card jam). Further a card unjust acquisition called phishing may occur wherein a card is intentionally jammed in the interior of the device and is pulled out and taken away while a user leaves the site to go for a person in charge.

The manual card reader and writers include a swipe type and an insertion type, whose structures do not permit the execution of write. According to these types, the read performance is directly influenced by the motion of the user's hand and therefore it is difficult to obtain a stable read characteristic.

Since the motion of the card is large in these devices of the manual type, skimming is apt to occur in which card information is read unjustly by a head mechanism additionally mounted within each device or near the card inlet.

As devices for solving such problems involved in the manual type there have been developed various card reader and writers configured such that a head is moved in a card information read/write direction perpendicular to a card insertion/ejection direction (see, for example, References 1 and 2).

[Reference 1] Japanese Patent No. 2586324

[Reference 2] Japanese Patent No. 2793434

However, even in a card reader and writer wherein a head moves in a card information read/write direction perpendicular to a card insertion/ejection direction as mentioned above, there is the possibility of occurrence of card jam and phishing as in the automatic type if the device is of a structure wherein the card is inserted completely into the interior of the device.

This problem can be solved by adopting a structure wherein read and write are performed in a state of the card not completely inserted into the interior of the device. However, if the card is not completely inserted into the interior of the device, the state of loading of the card becomes unstable and it has heretofore been impossible to perform a stable operation at the time of moving the head to read or write information.

Summary of the Invention

It is an object of the present invention to provide a card reader and writer capable of stably reading and writing information from and to a card even if it is of a construction such that a card insertion direction and a head moving direction are perpendicular to each other and the card is not completely inserted into the interior of the device.

A card reader and writer according to the present invention comprises card holding means for holding an inserted card and head moving means for moving an information read/write head in a direction perpendicular to a card insertion/ejection direction and is characterized in that the card holding means comprises insertion/ejection direction abutment means against which a front end of the card in the insertion direction comes into abutment and which is disposed so as to be movable in the card insertion/ejection direction, insertion/ejection direction position fixing means for fixing the insertion/ejection direction abutment means at a predetermined position in the insertion/ejection direction, and card gripping means for gripping the card from both ends of the card in the head moving direction in interlock with movement of the insertion/ejection abutment means in the card insertion direction.

According to this construction, when the card is inserted into the device, the front end of the card in the insertion direction comes into abutment against the insertion/ejection direction abutment means. Upon further insertion of the card, the insertion/ejection direction abutment means moves in the insertion direction as the card is pushed in. When the insertion/ejection abutment means is inserted a predetermined distance, it is fixed by the insertion/ejection direction position fixing means to fix the position of the card in the insertion/ejection direction. As the insertion/ejection direction abutment means moves in the insertion direction, the card gripping means which is contiguous thereto moves in interlock therewith so as to grip both ends of the inserted card in the head moving direction. At the time the insertion/ejection direction position fixing means fixes the insertion/ejection direction abutment means, the inserted card is gripped from both the ends mentioned above by the card gripping means. In this way the card is held.

A card reader and writer according to the present invention is characterized in that the insertion/ejection direction position fixing means comprises ejection direction urging force generating means for generating an urging force acting in the card ejection direction, a fixed shaft not interlocked with the movement of the insertion/ejection direction abutment means, a pivotal engaging member installed pivotally relative to the fixed shaft and adapted to pivot in contact with the insertion/ejection direction abutment means upon insertion of the card, and pivotal urging force generating means for generating a pivotal urging force acting in a direction opposite to the pivoting direction of the pivotal engaging member, the pivotal engaging member having an engaging portion which comes into engagement with the insertion/ejection direction abutment means upon receipt of the urging force acting in the card ejection direction and the pivotal urging force.

According to this construction, an urging force acting in the card ejection direction is constantly applied to the insertion/ejection direction abutment means. When in this state a card is inserted and abutted against the insertion/ejection direction abutment means, a force acts in a direction counter to the urging force acting in the ejection direction and the card is inserted thereby. When the card is further inserted and the insertion/ejection abutment means moves, a predetermined portion of the insertion/ejection direction abutment means comes into contact with the pivotal engaging member, so that a force acts on the pivotal engaging member in a direction counter to the pivotal urging force and the pivotal engaging member pivots. As the card is further inserted, the pivotal engaging member also pivots and the predetermined portion of the insertion/ejection direction abutment means reaches the engaging portion. The engaging portion is of a structure in which upon receipt of the urging force acting in the ejection direction and the pivotal urging force the engaging portion comes into engagement with the insertion/ejection direction abutment means. The insertion/ejection direction abutment means is fixed by engagement between its predetermined portion and the engaging portion, whereby the card position in its insertion direction is held.

A card reader and writer according to the present invention is characterized in that the card gripping means comprises a pair of head moving direction abutment means each for abutment against an end portion of the card in the head moving direction and an L-shaped interlocking member connected at one end to the insertion/ejection direction abutment means and at the other end to the head moving direction abutment means, the head moving direction abutment means and the interlocking members being each disposed symmetrically with respect to the card inserted.

According to this construction, when the insertion/ejection abutment means moves, the L-shaped interlocking members pivot symmetrically, whereby the movement in the card insertion/ejection direction is converted to a movement in the head moving direction. That is, at the time of insertion of the card, the movement in the insertion direction is converted to a movement approaching the end portion of the card in the head moving direction, while at the time of ejection of the card, the movement in the ejection direction is converted to a movement away from the end portion of the card in the head moving direction. In accordance with the movement of the L-shaped interlocking members the head movement direction abutment means installed respectively at front ends of the interlocking members move into abutment against or away from opposed ends of the card, whereby the card ends in the head moving direction are held and released.

A card reader and writer according to the present invention is characterized in that the head moving direction abutment means each comprise an abutment member for abutment against an end of the card and a connecting member which generates an urging force acting in a direction to expand a distance between the abutment member and the associated interlocking member and connects the abutment member with the interlocking member.

According to this construction, when the head moving direction abutment means contact the ends of the card, the abutment members first come into contact with the ends of the card. At this time a gripping force is scarcely exerted. As the pivotal member further pivots, an urging force is exerted on the abutment members by the connecting members disposed between the abutment members and the interlocking members. As a result, the urging force acts toward the card from the abutment members disposed at opposed positions and the card is gripped from the ends in the head moving direction.

A card reader and writer according to the present invention is characterized by including release means for forcibly releasing the fixing state of the insertion/ejection direction position fixing means.

According to this construction, when the card fixed by the above method is ejected, the engaged state is released by the release means. Once the engaged state is released, the insertion/ejection direction abutment means moves in the card ejecting direction with the urging force acting in the ejection direction, whereby the card is ejected.

A card reader and writer according to the present invention is characterized in that a case which houses therein card holding means and head moving means is formed in a shape such that at least part of the inserted card is exposed to the exterior.

According to this construction, since the card is partially exposed without being completely inserted, it is possible to touch the card at all times. That is, the card can be drawn out of the device any time. Besides, since it is not necessary to cover the whole of the card, the case is so much reduced in point of space.

According to the construction of the present invention, since the card inserting direction and the head moving direction are set perpendicular to each other and the read and write of information for the card are performed by moving the head, the card holding state can be made stabler than in the conventional manual type card reader and writer. Consequently, the read and write of information from and to the card can be done more accurately and positively in comparison with the conventional device.

In particular, according to the present invention, since a card can be held positively even by the structure wherein the card is not completely inserted into the case, it is possible to constitute an extremely space-saved card reader and writer wherein part of the card inserted is exposed to the exterior. Consequently, it is possible to prevent phishing, card jam and skimming and perform read and write of card information positively.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

A card reader and writer embodying the present invention will be described hereinunder with reference to FIGS. 1 to 4.

Figure 1A:
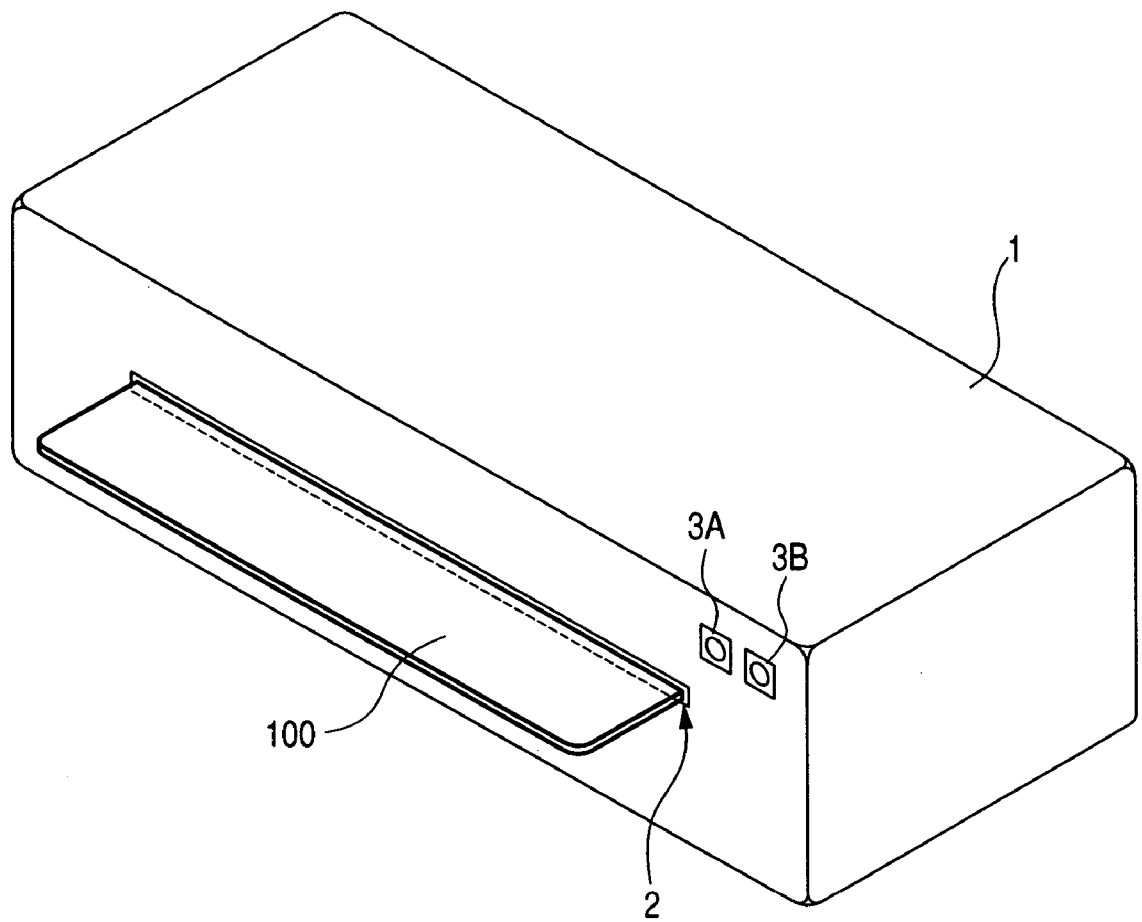
FIGS. 1A and 1B are an appearance perspective view and a front view, respectively, of a card reader and writer embodying the present invention.
Figure 1B:
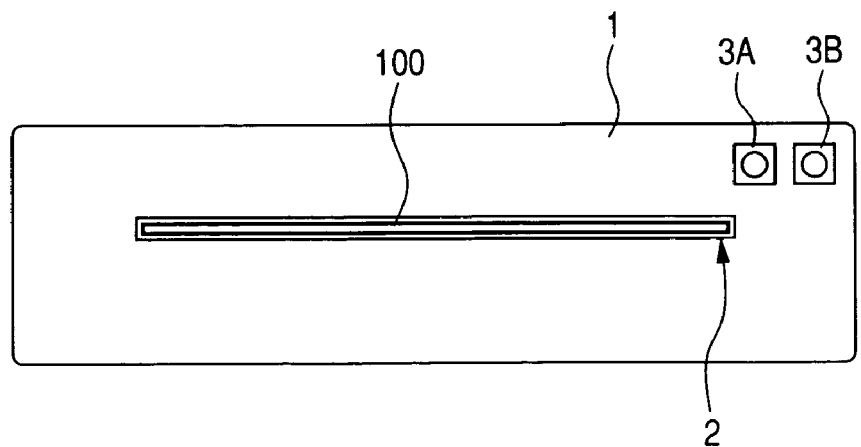

FIG. 1A is an appearance perspective view of the card reader and writer of this embodiment and FIG. 1B is a front view thereof.

Figure 2A:
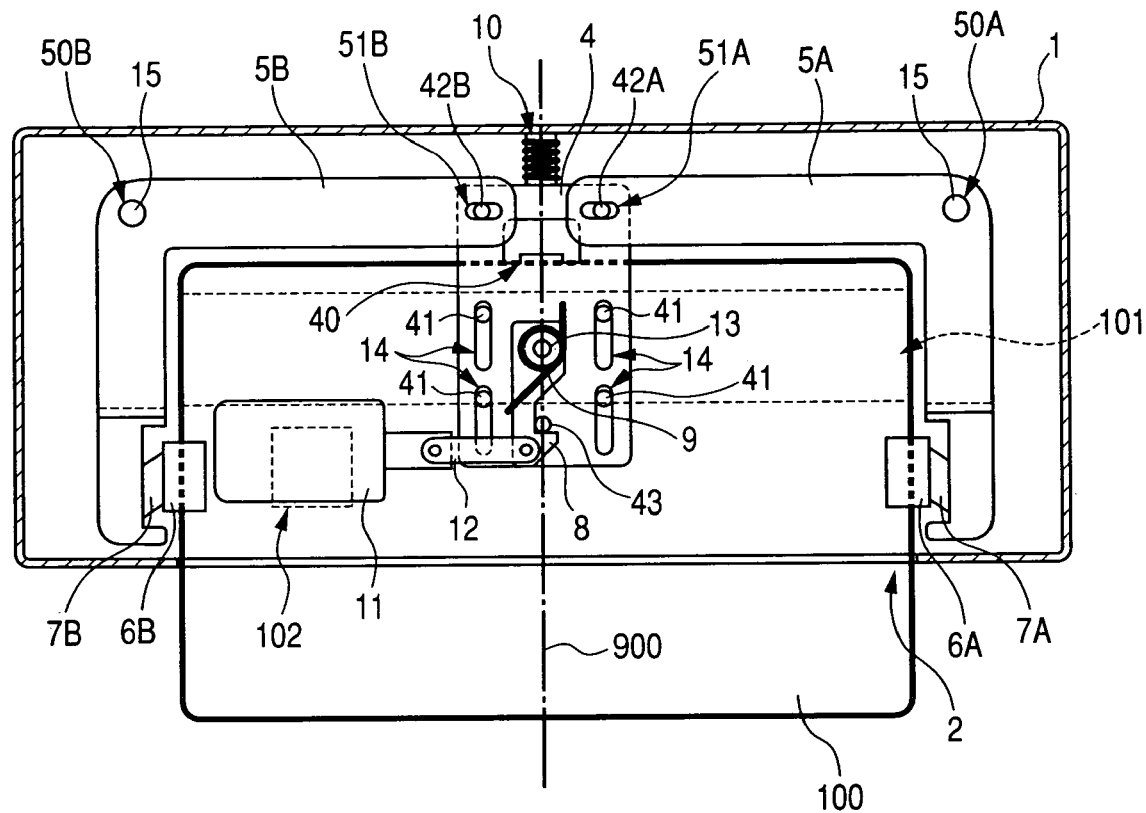
FIGS. 2A and 2B are a sectional plan view and a sectional front view, respectively, of the card reader and writer.
Figure 2B:
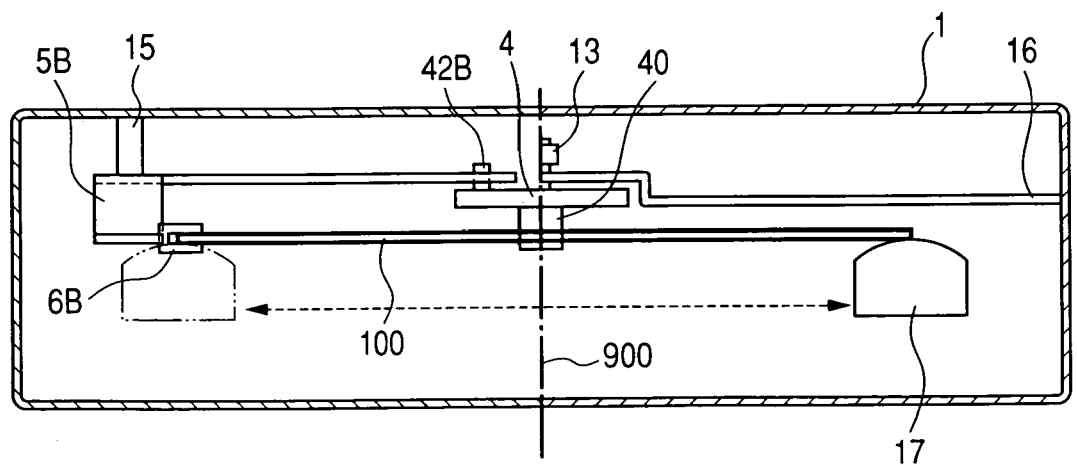

FIG. 2A is a sectional plan view of a card 100 held in the card reader and writer shown in FIG. 1, and FIG. 2B is a sectional front view thereof.

The card reader and writer has a card inlet 2 and lamps 3A and 3B in the front of a case 1, the case 1 having a predetermined shape such as, for example, a generally rectangular parallelepiped shown in FIG. 1. The case 1 is formed to be long in its width direction and short in its depth direction as viewed from the front, according to the shape of the card 100 to be inserted. The card 100 is inserted in such a manner that an extending direction of a magnetic information recording portion 101 is parallel to the width direction (the direction connecting both the lateral sides) of the case 1 and that the depth direction of the case 1 perpendicular to the width direction is a card inserting direction. In this case, the card 100 is inserted from the card inlet 2 in such a manner that an end portion of the cad 100 located near the magnetic information recording portion 101 is inserted first.

When the card 100 is inserted from the card inlet 2 into the card reader and writer, it is held by a mechanism to be described later in a state in which part of the card is exposed the outside. At this time, the card 100 is held in a state in which the magnetic information recording portion 101 and an IC chip 102 are housed within the case 1 and an area of the card 100 is exposed so as to permit the user to grip the card easily. The card reader and writer reads information recorded in the magnetic information recording portion 101 and the IC chip 102 and writes new information (update information) to the magnetic information recording portion 101 and the IC chip 102. The card reader and writer checks these operations and control turning ON and OFF the lamps 3A and 3B, thereby displaying the end of operation and the occurrence of error to the exterior.

The interior structure of the card reader and writer includes a slider 4 having a depth abutment member 40, pivotal levers 5A and 5B, holders 6A and 6B, plate springs 7A and 7B, a pivotal engaging member 8, a return spring 9, an ejection spring 10, a solenoid 11, a link 12, and a magnetic head 17.

In the present invention, the slider 4 corresponds to the "insertion/ejection direction abutment means", the pivotal levers 5A and 5B correspond to the "interlocking members of the card gripping means", the holders 6A and 6B correspond to the "abutment members in the head moving direction abutment means", and the plate springs 7A and 7B correspond to the "connecting members in the head moving direction abutment means". Further, the return spring 9 corresponds to the "pivotal urging force generating means", the ejection spring 10 corresponds to the "ejection direction urging force generating means", and the solenoid 11 and the link 12 correspond to the "release means".

The flat plate-like slider 4 is disposed at a substantial center in the width direction of the case 1 corresponding to the center in the width direction of the card 100. The slider 4 includes the depth abutment member 40, guide shafts 41, connecting shafts 42A and 42B, and an engaging shaft 43, and is disposed so as to be movable in an insertion/ejection direction (front-depth direction) of the card 100 relative to the case 1. The depth abutment member 40 is disposed at a position at which the depth-side end face of the card 100 comes into abutment against the depth abutment member when the card is inserted a predetermined distance. The slider 4 is formed with a plurality of the guide shafts 41, which are positioned symmetrically with respect to a symmetric plane 900 that includes the center in the width direction of the case 1 and that is parallel to the lateral side faces of the case. The guide shafts 41 are inserted into sliding guide slots 14 or through grooves formed fixedly in the case 1 and having respective major axes in the insertion/ejection direction. The connecting shafts 42A and 42B are members formed at symmetric positions with respect to the aforesaid symmetric plane and are positioned on the depth side of the case 1 in the slider 4. The connecting shafts 42A and 42B are inserted into a connecting slot 51A formed in the pivotal lever 5A and a connecting slot 51B formed in the pivotal lever 5B, respectively. The engaging shaft 43 is formed on the side of the card inlet 2 in the slider 4 at a position on the symmetric plane 900, i.e., on the central axis in the width direction of the slider 4 and case 1. The engaging shaft 43 is formed in a shaft shape as with the connecting shafts 42A and 42B.

The pivotal levers 5A and 5B are each formed to bend halfway at an approximately right angle, that is, to be in an L-shape, and are disposed symmetrically with respect to the symmetric plane 900. Shaft support holes 50A and 50B are formed in the bent positions of the pivotal levers 5A and 5B, respectively, and lever pivoting shafts 15 fixed to the case 1 are inserted into the shaft support holes 50A and 50B, respectively. The pivotal levers 5A and 5B are respectively formed with connecting slots 51A and 51B, which are formed as through holes, at its one end portions (end portions extending in the width direction of the card 100 in a fixed state). The connecting slots 51A and 51B each have a major axis extending in the width direction of the card 100. The connecting shafts 42A and 42B of the slider 4 are fitted in the connecting slots 51A and 51B, respectively. The pivotal levers 5A and 5B are respectively connected to plate springs 7A and 7B at the other end portions thereof (end portions extending in the insertion/ejection direction of the card 100 in a fixed state). The plate springs 7A, 7B extend obliquely toward the central side of the width direction and the depth side. Holders 6A and 6B are attached to the plate springs 7A and 7B, respectively.

The holders 6A and 6B are each formed in a rectangle with one side open, in a cross-section taken along a plane parallel to the front face of the case 1 in a held state of the card 100. End portions of the card 100 in the width direction are each inserted into the open side of each of the holders and end faces of the card 100 in the width direction come into abutment against an elastic member, e.g., rubber, provided within the holders. Since the holders 6A and 6B are disposed symmetrically with respect to the symmetric plane 900, both ends of the card 100 in the width direction also come into abutment against the holders 6A and 6B, whereby the card 100 is held.

The plate springs 7A is disposed between the holder 6A and the pivotal lever 5A and provides connection therebetween. Likewise, the plate spring 7B is disposed between the holder 6B and the pivotal lever 5B and provides a connection between the two. The plate springs 7A and 7B are installed so that an urging force is generated from the pivotal levers 5A and 5B to the holders 6A and 6B, respectively, in the width direction and the insertion direction of the card 100.

Figure 3:
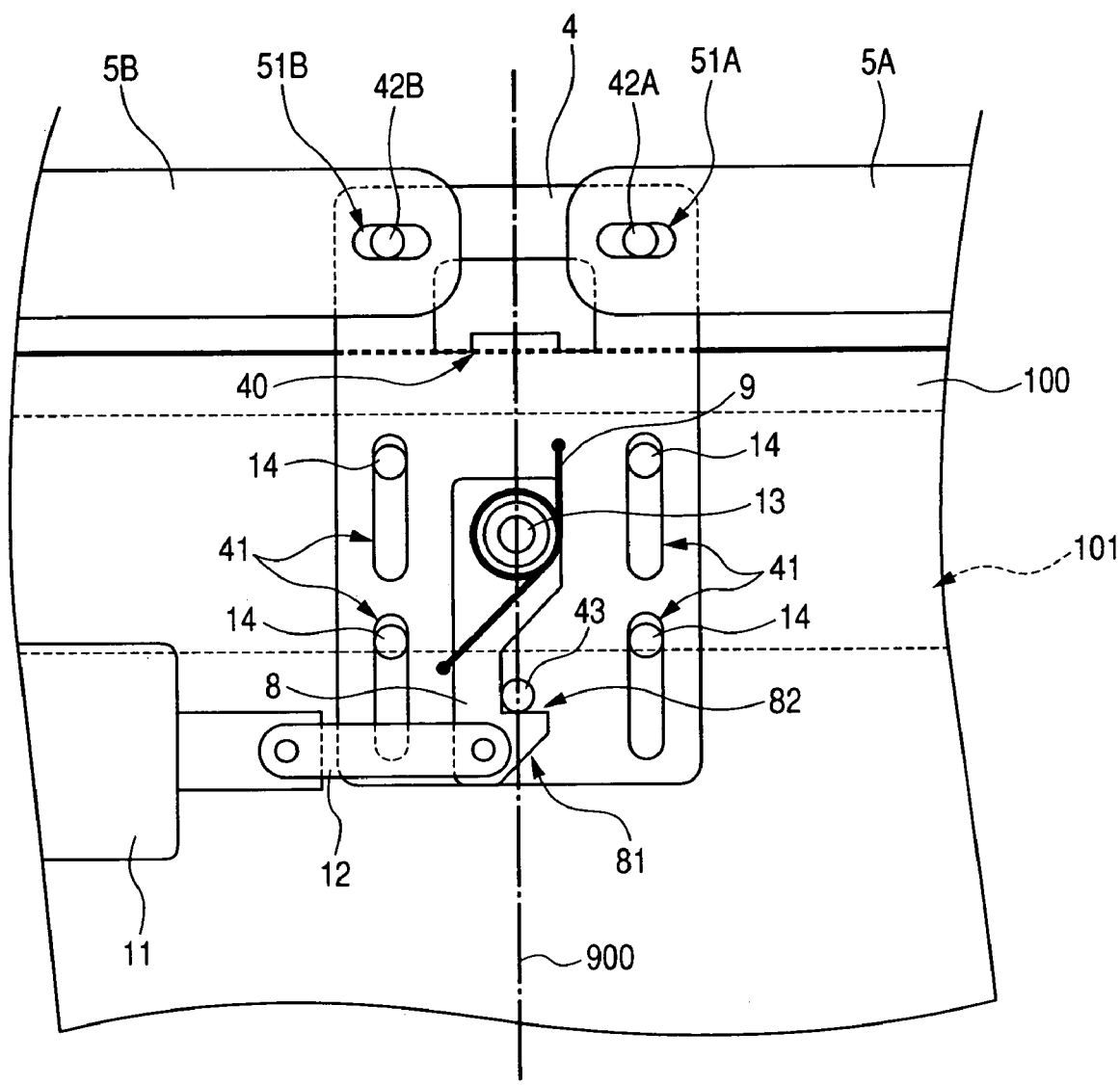
FIG. 3 is an enlarged plan view of a pivotal engaging member.

The pivotal engaging member 8 is installed pivotally relative to a fixed shaft 13 which is fixed to the case 1 through a shaft fixing chassis 16. FIG. 3 is an enlarged plan view of a portion including the pivotal engaging member 8.

The pivotal engaging member 8, which is like a flat plate, is installed pivotally around the fixed shaft 13 at a position near its one end in the longitudinal direction thereof. The pivotal engaging member 8 is formed at the other end in the longitudinal direction thereof with a slant face 81 having an end face formed in a partially cut-out shape and having a predetermined angle relative to the insertion/ejection direction. According to the structure of the pivotal engaging member 8, when the card 100 is inserted and the engaging shaft 43 of the slider 4 comes into abutment against the slant face 81, the pivotal engaging member 8 pivots about the fixed shaft 13 so that the engaging shaft 43 moves along the slant face 81 in accordance with a further movement in the card inserting direction of the engaging shaft 43. At this time, the return spring 9 gives the pivotal engaging member 8 an urging force in a direction opposite to the pivotal motion responsive to the movement of the engaging shaft 43. When the card 100 is further inserted and the pivotal engaging member 8 pivots, the engaging shaft 43 and the slant face 81 are brought out of contact with each other and the engaging shaft 43 comes into engagement with an engaging recess 82 formed in the pivotal engaging member 8. The engaging recess 82 corresponds to the "engaging portion" defined in the present invention. The engaging recess 82, with the engaging shaft 43 engaged therein, has a wall on the ejection side of the card 100 from the engaging shaft 43 and also has a wall on the side where the urging force provided from the return spring 9 is imparted to the engaging shaft 43.

The ejection spring 10 is disposed at a depth-side end portion of the case 1 in the slider 4 and generates an urging force for constantly moving the slider 4 toward the card inlet 2.

The solenoid 11 is connected to the pivotal engaging member 8 through the link 12 and is energized at the time of ejection of the card 100 to disengage the engaging recess 82 of the pivotal engaging member 8 from the engaging shaft 43 of the slider 4.

The magnetic head 17 is disposed at a position opposed to the magnetic information recording portion 101 of the card 100 in the held state of the card. With a conveyance mechanism (not shown), the magnetic head 17 reciprocates in the extending direction of the magnetic information recording portion 101 to read and write magnetic information.

Though not shown, a connecting terminal is connected to the IC chip 102 of the card 100 in the held state of the card to read and write data from and to the IC chip 102.

The following description is now provided of the operation of the card reader and writer constructed as above.

Figure 4A:
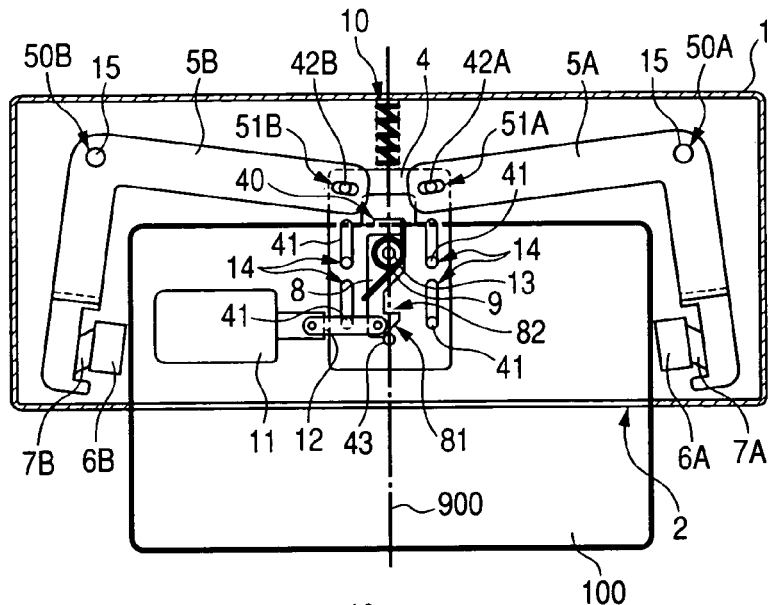
FIGS. 4A, 4B and 4C illustrate motions of various portions of the card reader and writer upon insertion of a card.
Figure 4B:
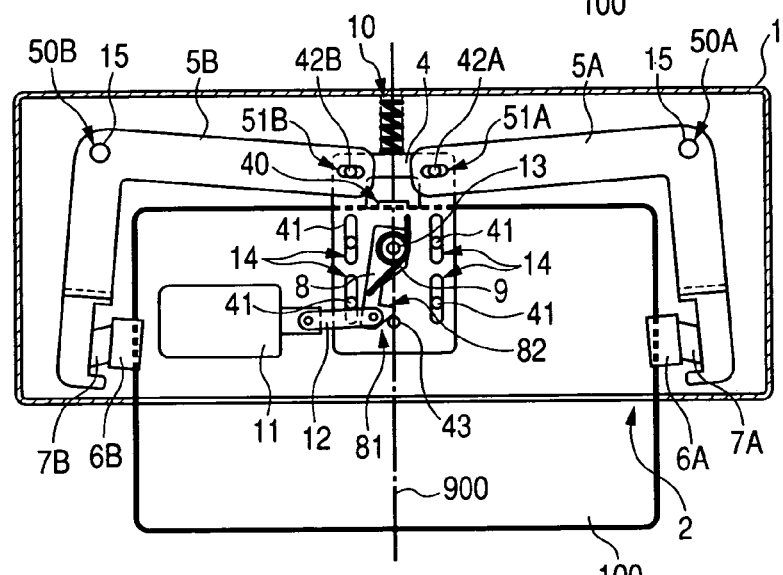
Figure 4C:
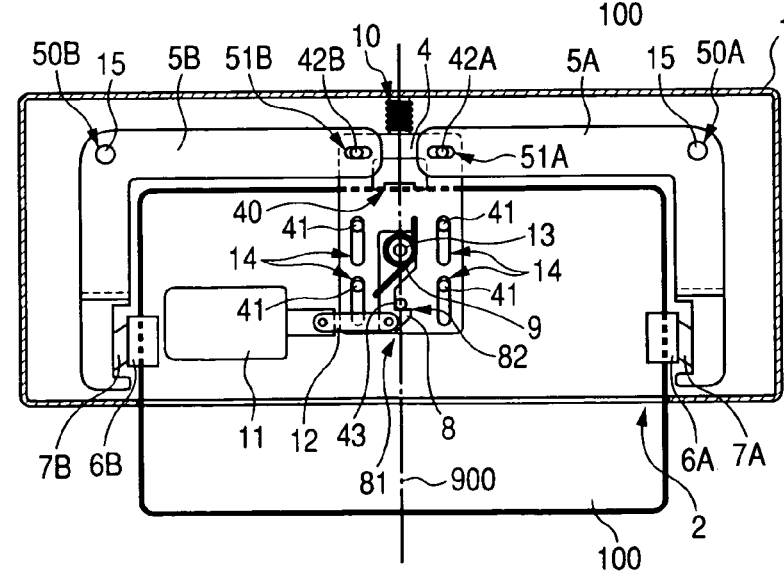

FIG. 4 illustrates motions of various portions of the card reader and writer upon insertion of the card 100, in which FIG. 4A shows a state at the beginning of insertion of the card, FIG. 4B shows a state during the insertion, and FIG. 4C shows a held state of the card.

(1) When the card 100 is inserted a predetermined distance from the card inlet 2, the insertion-side end face of the card 100, i.e., the card end face located on the depth side of the case 1, comes into abutment against the depth abutment member 40 of the slider 4. At this time, the pivotal levers 5A, 5B are disposed such that its end portions on the sides of the holders 6A, 6B are open so that the holders 6A and 6B are spaced away from both ends of the card 100 in the width direction.

(2) Next, as the card 100 is further inserted, the slider 4 moves in the same direction as the card inserting direction together with the card 100. At this time, the ejection spring 10 imparts an urging force for moving the slider 4 toward the card inlet 2 to the end portion of the slider 4 located on the depth side of the case 1. However, the card 100 is inserted with a larger force than this urging force.

The guide shafts 41, which are installed in the slider 4 as noted above, move along the inner walls of the sliding guide slots 14 fixedly formed in the case 1, whereby the slider 4 moves exactly in the insertion direction of the card 100.

When the connecting shafts 42A and 42B move together with the slider 4, a force is applied from the connecting shafts 42A and 42B to the inner walls of the connecting slots 51A and 51B of the pivotal levers 5A and 5B in which slots the connecting shafts 42A and 42B are inserted, thus causing the pivotal levers 5A and 5B to pivot about the lever pivoting shafts 15, respectively. In this connection, the pivotal levers 5A and 5B are in an L-shape, which is bent at approximately right angles at the portions of the lever pivoting shafts 15. When the end portions of the pivotal levers 5A and 5B located on the sides of the connecting slots 51A, 51B pivot substantially in the card inserting direction, the end portions of the pivotal levers 5A and 5B located on the sides of the holders 6A, 6B pivot toward the center of the card 100 in the width direction of the card. As a result of this pivotal motion, both ends in the width direction of the card 100 are received within the one side open spaces of the holders 6A and 6B, respectively.

When the engaging shaft 43 of the slider 4 moves together with the slider, the engaging shaft 43 comes into abutment against the slant face 81 of the pivotal engaging member 8 at a certain time point. Further, when the card 100 is inserted and the slider 4 moves, the engaging shaft 43 pushes the pivotal engaging member 8 to cause it to pivot about the fixed shaft 13. At this time, an urging force from the return spring 9 is imparted to the pivotal engaging member 8 in a direction to push back the engaging shaft 43.

(3) Next, as the card 100 is further inserted, the slider 4 moves to the inner side of the case 1 in accordance with the amount of insertion of the card. This movement of the slider 4 is transmitted through the connecting shafts 42A, 42B and connecting slots 51A, 51B to the pivotal levers 5A and 5B, causing the pivotal levers 5A and 5B to further pivot. With this movement, the holders 6A and 6B approach both ends of the card 100 in the width direction and the elastic members 61 of the holders 6A and 6B come into abutment against both ends of the card 100 in the width direction. At this time, the holders 6A and 6B are given urging forces, from the plate springs 7A and 7B, acting centrally in the width direction of the card 100 and in the card inserting direction. This urging force, in other words, is an urging force advancing toward the depth-side center in the card inserting direction from near both ends of the card inlet 2, and it serves as both a force for gripping the card 100 in the width direction and a force for pushing the card in the insertion direction.

With a further movement in the insertion direction of the slider 4, the engaging shaft 43 of the slider causes the pivotal engaging member 8 to pivot, but when the pivotal engaging member 8 pivots a predetermined distance, the slider becomes disengaged from the slant face 81 and further moves in the insertion direction. With this movement, only the biasing force of the return spring 9 is exerted temporarily on the pivotal engaging member 8, which in turn pivots in the direction opposite to the direction of the pivotal movement caused by the engaging shaft 43. With this return pivot motion of the pivotal engaging member 8, the engaging shaft 43 is fitted in the engaging recess 82 of the pivotal engaging member 8. If the insertion of the card 100 is stopped at this time point, the engaging shaft 43 and the engaging recess 82 are engaged with each other with the urging force provided from the ejection spring 10 through the slider 4 and acting in the card ejecting direction (in the card inlet direction) and the urging force provided from the card inlet-side wall surface of the engaging recess 82 of the pivotal engaging member 8. Thus, the position of the engaging shaft 43 is held relative to the insertion direction, whereby the position of the slider 4 is held and the position in the insertion direction of the card 100 abutted against the depth abutment member 40 of the slider 4 is held.

Thus, according to the construction of this embodiment, the card 100 is held firmly in both the insertion direction and width direction. Moreover, the position of the card 100 can be held without complete insertion of the card into the case 1.

(4) Next, when the card 100 is ejected, the solenoid 11 is energized, whereby the link 12 connected to the solenoid is pulled toward the solenoid, causing the pivotal engaging member 8 to pivot. This pivoting direction is a direction reverse to the urging force generating direction by the return spring 13, i.e., a direction to release the engaging shaft 43 from the engaging recess 82. When the amount of this pivotal movement exceeds a predetermined amount, the engaging shaft 43 is disengaged from the engaging recess 82. Upon release of the engaging shaft 43, only the urging force provided from the ejection spring 10 is applied to the slider 4, so that the slider 4 moves from the depth side of the case 1 toward the card inlet 2 (front side). With such a movement of the slider 4 toward the card inlet 2, the card 100 which is in abutment against the slider 4 through the depth abutment member 40 is ejected toward the card inlet 2. By using such a structure the card 100 can be ejected easily.

According to the construction described above it is possible to effect read and write of information from and to the card while holding the card positively without complete insertion into the case. Consequently, a card reader and writer adapted to operate for read and write positively can be implemented by a relatively simple structure while preventing card jam, phishing and skimming. Further, since a card ejection mechanism is formed by a simple structure using a solenoid, it is possible to implement, with a relatively simple structure, a card reader and writer which permits positive insertion, holding and ejection of a card.

Although the card used in the above embodiment is a card having the magnetic information recording portion and the IC chip, the construction described above is applicable to any other paper or sheet insofar as the paper or sheet has the same structure as that described above. Also in this case it is possible to obtain the above effects.

Although in the above embodiment a symmetric plane is positioned centrally in the width direction of the case, the relation between the symmetric plane and the case is not specially limited insofar as the symmetric plane is positioned centrally in the width direction of an inserted card.

I claim:

1. A card reader and writer comprising:
   card holding means for holding an inserted card; and
   head moving means for moving an information read/write head in a direction perpendicular to a card insertion/ejection direction;
   said card holding means comprising:
   insertion/ejection direction abutment means against which a front end of the card in a card insertion direction comes into abutment and which is disposed so as to be movable in the card insertion/ejection direction;
   insertion/ejection direction position fixing means for fixing said insertion/ejection direction abutment means at a predetermined position in the insertion/ejection direction; and
   card gripping means for gripping the card from both ends of the card in the head moving direction in interlock with movement of said insertion/ejection abutment means in the card insertion direction; and
   wherein said insertion/ejection direction position fixing means comprises:
   ejection direction urging force generating means for generating an urging force in the card ejection direction;
   a fixed shaft not interlocked with the movement of said insertion/ejection direction abutment means;
   a pivotal engaging member installed pivotally relative to said fixed shaft and adapted to pivot in contact with said insertion/ejection direction abutment means upon insertion of the card; and
   pivotal urging force generating means for generating a pivotal urging force acting in a direction opposite to the pivoting direction of said pivotal engaging member;
   wherein said pivotal engaging member has an engaging portion which comes into engagement with said insertion/ejection direction abutment means upon receipt of the urging force in the card ejection direction and said pivotal urging force.

2. A card reader and writer comprising:
   card holding means for holding an inserted card; and
   head moving means for moving an information read/write head in a direction perpendicular to a card insertion/ejection direction;
   said card holding means comprising:
   insertion/ejection direction abutment means against which a front end of the card in a card insertion direction comes into abutment and which is disposed so as to be movable in the card insertion/ejection direction;
   insertion/ejection direction position fixing means for fixing said insertion/ejection direction abutment means at a predetermined position in the insertion/ejection direction; and
   card gripping means for gripping the card from both ends of the card in the head moving direction in interlock with movement of said insertion/ejection abutment means in the card insertion direction; and
   wherein said card gripping means comprises:
   a pair of head moving direction abutment means each for abutment against an end portion of the card in the head moving direction; and
   a pair of L-shaped interlocking members each connected at one end to said insertion/ejection direction abutment means and at the other end to said head moving direction abutment means;
   wherein each of said head moving direction abutment means and said interlocking members is disposed symmetrically with respect to the card.

3. A card reader and writer according to claim 1,
   wherein said card gripping means comprises:
   a pair of head moving direction abutment means each for abutment against an end portion of the card in the head moving direction; and
   a pair of L-shaped interlocking members each connected at one end to said insertion/ejection direction abutment means and at the other end to said head moving direction abutment means;
   wherein each of said head moving direction abutment means and said interlocking members is disposed symmetrically with respect to the card.

4. A card reader and writer according to claim 2,
   wherein said head moving direction abutment means each comprise:
   an abutment member for abutment against an end of the card; and
   a connecting member which generates an urging force acting in a direction to expand a distance between said abutment member and the associated interlocking member and connects the abutment member with the interlocking member.

5. A card reader and writer according to claim 3,
   wherein said head moving direction abutment means each comprise:
   an abutment member for abutment against an end of the card; and
   a connecting member which generates an urging force acting in a direction to expand a distance between said abutment member and the associated interlocking member and connects the abutment member with the interlocking member.

6. A card reader and writer according to claim 5, further comprising release means for forcibly releasing the fixing state of said insertion/ejection direction position fixing means.

7. A card reader and writer according to claim 6, wherein a case which houses therein said card holding means and said head moving means is formed in a shape such that at least part of the card inserted is exposed to the exterior.

8. A card reader and writer comprising:

a head moving mechanism for moving an information read/write head in a direction perpendicular to a card insertion/ejection direction;

a slider against which a front end of the card in a card insertion direction comes into abutment and which is disposed so as to be movable in the card insertion/ejection direction;

a insertion/ejection direction position fixing mechanism for fixing said slider at a predetermined position in the insertion/ejection direction; and a card holding mechanism for holding the card from both ends of the card in the head moving direction in interlock with movement of said slider in the card insertion direction; and wherein said insertion/ejection direction position fixing mechanism comprises:

a ejection spring for generating an urging force in the card ejection direction;

a fixed shaft not interlocked with the movement of said slider;

a pivotal engaging member installed pivotally relative to said fixed shaft and adapted to pivot in contact with said slider upon insertion of the card; and a return spring for generating a pivotal urging force acting in a direction opposite to the pivoting direction of said pivotal engaging member;

wherein said pivotal engaging member has an engaging portion which comes into engagement with said slider upon receipt of the urging force in the card ejection direction and said pivotal urging force.

9. A card reader and writer comprising:

a head moving mechanism for moving an information read/write head in a direction perpendicular to a card insertion/ejection direction;

a slider against which a front end of the card in a card insertion direction comes into abutment and which is disposed so as to be movable in the card insertion/ejection direction;

a insertion/ejection direction position fixing mechanism for fixing said slider at a predetermined position in the insertion/ejection direction; and a card holding mechanism for holding the card from both ends of the card in the head moving direction in interlock with movement of said slider in the card insertion direction; and wherein said holding mechanism comprises:

a pair of holders each for abutment against an end portion of the card in the head moving direction; and a pair of L-shaped interlocking members each connected at one end to said slider and at the other end to said holder;

wherein each of said holder and said interlocking members is disposed symmetrically with respect to the card.

* * * * *